Dec. 20, 1960  L. E. KUNTZ  2,964,944
LIQUID MEASURING SYSTEM
Filed July 8, 1957  3 Sheets-Sheet 1

INVENTOR.
L. E. KUNTZ
BY Hudson & Young
ATTORNEYS

Dec. 20, 1960     L. E. KUNTZ     2,964,944
LIQUID MEASURING SYSTEM

Filed July 8, 1957     3 Sheets-Sheet 2

INVENTOR.
L. E. KUNTZ

BY Hudson & Young

ATTORNEYS

INVENTOR.
L. E. KUNTZ
BY Hudson & Young
ATTORNEYS

United States Patent Office 2,964,944
Patented Dec. 20, 1960

2,964,944

LIQUID MEASURING SYSTEM

Louis E. Kuntz, Bartlesville, Okla., assignor to Phillips Petroleum Company, a corporation of Delaware Filed July 8, 1957, Ser. No. 670,536

3 Claims. (Cl. 73—219)

This invention relates to apparatus for measuring volumes of liquid in terms of the corresponding volumes of the liquid at a reference temperature.

In the petroleum industry, it is common practice to gather oil from a plurality of producing wells at a single location adjacent a pipeline. The oil is treated at this location to remove sludge and water, metered and transferred into the pipeline. Automatic custody transfer systems are presently being developed to carry out these operations with a minimum amount of supervision. One of the problems involved is to meter accurately the oil which is transferred to the pipeline. Since oil is commonly sold on the basis of barrels at a reference temperature, such as 60° F., it is necessary that the actual measured volume be corrected to designate the corresponding volume at this reference temperature.

In accordance with the present invention, apparatus is provided which is capable of measuring volumes of oil accurately and presenting the measured volumes in terms of corrected volumes at a reference temperature. The measuring apparatus comprises one or more tanks of known volume. These tanks are filled with the oil and subsequently discharged into the pipeline. The number of discharges of oil from the tanks thus represents the actual volume of oil delivered to the pipeline. Apparatus is provided to measure the temperature of each volume of oil discharged from the measuring tanks. Recording apparatus is provided which is actuated as a function of the measured temperature so that a printed record is made of the corrected volume of oil discharged from the tanks. This provides a permanent record of the corrected volume of oil delivered to the pipeline.

Accordingly, it is an object of this invention to provide apparatus for measuring tempearture corrected volumes of oil transmitted to a pipeline from a gathering station.

Another object is to provide apparatus for measuring volumes of liquid in terms of the corresponding volumes of the liquid at a reference temperature.

Other objects, advantages and features of the invention should become apparent from the following detailed description which is taken in conjunction with the accompanying drawing in which.

Figure 1:
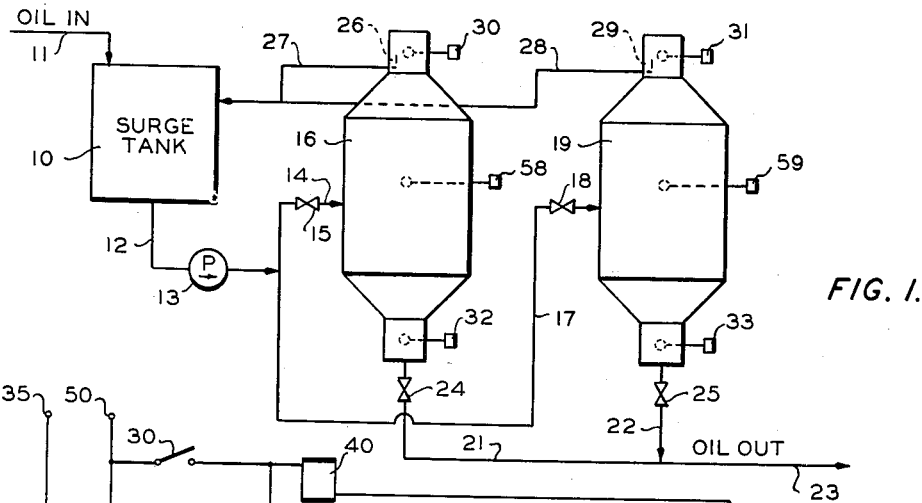
Figure 1 is a schematic representation of metering tanks employed to measure the volumes of oil transmitted to a pipeline.

Referring now to the drawing in detail, and to Figure 1 in particular, there is shown a surge tank 10 which is supplied with treated oil from an inlet conduit 11. Oil is removed from tank 10 through a conduit 12 which has a pump 13 therein. A conduit 14, having a valve 15 therein, communicates between conduit 12 and a first metering tank 16. A conduit 17, having a valve 18 therein, communicates between conduit 12 and a second metering tank 19. Oil is removed from tanks 16 and 19 through respective conduits 21 and 22 which communicate with a conduit 23 that delivers the oil to a pipeline. Valves 24 and 25 are disposed in respective conduits 21 and 22. Tanks 16 and 19 are provided with respective overflow pipes 26 and 29 in the upper regions thereof. These pipes communicate with surge tank 10 by means of respective conduits 27 and 28. Level responsive switches 30 and 31 are disposed in the upper regions of respective tanks 16 and 19, and level responsive switches 32 and 33 are disposed in the lower regions of respective tanks 16 and 19. These switches control the valves in the inlet and outlet conduits communicating with the tanks in the manner described hereinafter.

Figure 2:
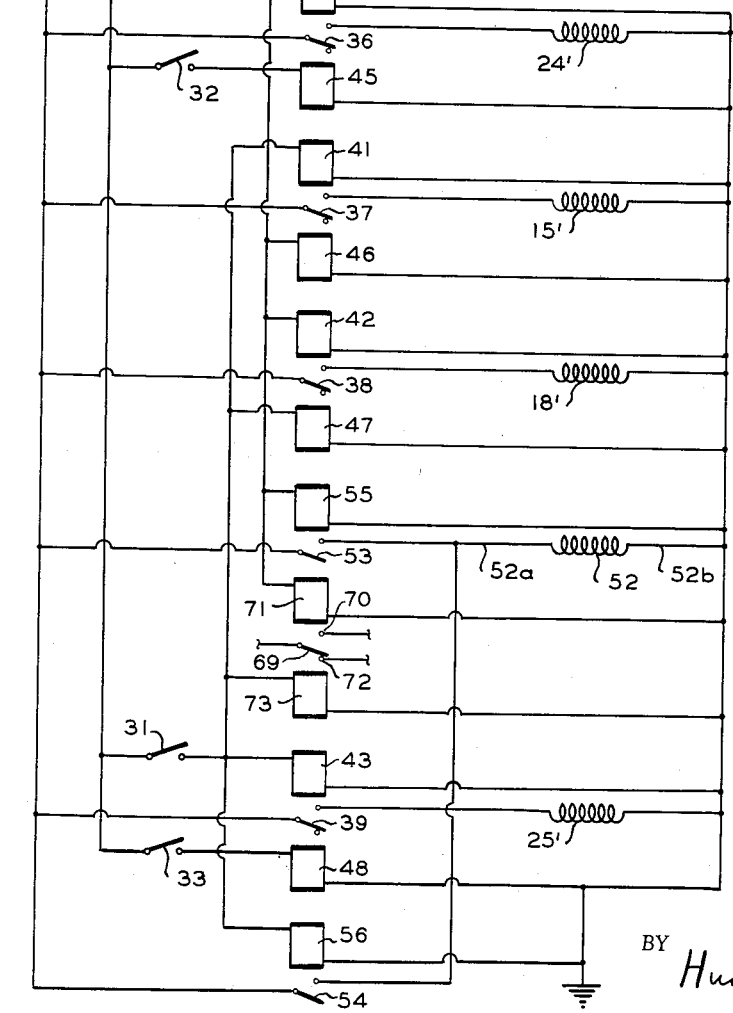
Figure 2 is a schematic circuit diagram of the apparatus employed to control the valves in the metering system of Figure 1.

The valve control circuit is illustrated schematically in Figure 2. Valves 15, 18, 24 and 25 are opened when respective solenoids 15′, 18′, 24′ and 25′ are energized. Solenoids 24′, 15′, 18′ and 25′ are connected between a potential terminal 35 and ground through respective switches 36, 37, 38 and 39. Switches 36, 37, 38 and 39 are closed when respective relay coils 40, 41, 42 and 43 are energized; and switches 36, 37, 38 and 39 are opened when respective relay coils 45, 46, 47 and 48 are energized. Relay coils 40, 46 and 42 are connected between a potential terminal 50 and ground through switch 30. Switch 30 is closed when the oil level rises to the level of the switch in tank 16. Relay coil 45 is connected between terminal 50 and ground through switch 32. Switch 32 is open when the oil level is above the switch and closed when the oil level falls below the switch. Relay coils 41, 47 and 43 are connected between terminal 50 and ground through switch 31. Switch 31 is closed when the oil in tank 19 rises to the level of the switch. Relay coil 48 is connected between terminal 50 and ground through switch 33. Switch 33 is open when the oil level is above the switch and closed when the oil level falls below the switch.

The operation of the metering apparatus of Figures 1 and 2 should now be apparent. For purposes of description, it is assumed that valves 15 and 25 initially are open and valves 24 and 18 are closed. Oil from surge tank 10 is thus directed into tank 16. Oil continues to rise in this tank until it reaches the level of switch 30 which is adjacent overflow pipe 26. The rising oil level closes switch 30 to energize relay coils 40, 46 and 42. The relays 40 and 42 are of the time delay type so that a short delay is encountered before switches 36 and 38 are closed. Closure of switches 36 and 38 results in solenoids 24′ and 18′ being energized to open valves 24 and 18. The opening of switch 37 results in solenoid 15′ being deenergized so that valve 15 is closed. The volume of oil in tank 16 then drains into conduit 23. When the oil level falls below switch 32, this switch is closed to energize relay coil 45 to open switch 36 after a predetermined delay. This delay insures that all of the oil is drained from tank 16. The opening of switch 36 deenergizes solenoid 24′ to close valve 24.

The previously mentioned closing of switch 30 due to the rising oil level in tank 16 results in oil from tank 10 being directed into tank 19. The oil then rises in tank 19 until switch 31 is closed by the rising oil level. The subsequent operation of the switches and valves associated with tank 19 is identical to the previously described operation of the corresponding switches and valves associated with tank 16. The overflow pipes 26 and 29 in the two tanks insure that constant volumes of oil are contained in these tanks when valves 24 and 25 are opened to drain the tanks. The apparatus is constructed such that the oil is drained from the tanks at a rate greater than the oil is supplied to the tanks so that the tanks are always drained before additional oil is supplied thereto.

Switches 30, 31, 32 and 33 can be conventional float switches, capacitance probes or other conventional level responsive devices. While valves 15, 18, 24 and 25 have been illustrated as solenoid operated, it should be evident that other types of valves can be employed. The valves can be motor or pneumatically operated, for example.

It should be evident that a record of the number of times the tanks are emptied provides a record of the total volume of oil transferred through the metering system. This record is obtained by means of a recorder which is actuated by a solenoid 52 which is connected between terminal 35 and ground through parallel switches 53 and 54. Switches 53 and 54 are closed by respective relay coils 55 and 56. These relay coils are energized by respective switches 30 and 31 being closed. Solenoid 52 actuates the recording mechanism described hereinafter so that a record is made each time one of the tanks starts to empty.

As previously mentioned, the density of the oil in the tanks is a function of temperature. Since it is common practice to sell oil on the basis of volume at a reference temperature, means are provided for recording the oil transmitted in terms of the corresponding volume of oil at the reference temperature. This is accomplished by means of temperature sensing devices 58 and 59 which measure the temperature of oil in respective tanks 16 and 19. These two temperature sensing devices can be respective thermocouples 58' and 59' of Figure 4. The negative terminals of these two thermocouples are connected to the grounded negative terminal of a direct voltage source 60. The positive terminal of voltage source 60 is connected through a potentiometer 61 to the grounded negative terminals. The contactor of potentiometer 61 is connected to a contact 62 which is adapted to vibrate between stationary contacts 63 and 64. The movement of contact 62 is effected by a coil 65 which is energized from a source of alternating current 66. Stationary contacts 63 and 64 are connected to the respective end terminals of the primary winding 67 of a transformer 68. The center tap of transformer winding 67 is connected to a switch 69. Switch 69 engages a terminal 70 when a relay coil 71 of Figure 2 is energized and a terminal 72 when a relay coil 73 of Figure 2 is energized. Relays 71 and 73, which are of the delay type, are energized by respective switches 30 and 31 being closed. Thus, thermocouple 58' or 59' is connected into the measuring circuit of Figure 4 when oil is rising in the tank in which the respective thermocouple is positioned.

The secondary winding 75 of transformer 68 is connected to the input of a voltage amplifier 76. The first output terminal of amplifier 76 is connected through a capacitor 77 to the control grids of a pair of triodes 78 and 79. The control grids of these triodes are connected to ground through a common resistor 80. The second output terminal of amplifier 76 is connected to ground. The cathodes of triodes 78 and 79 are connected to ground through a common resistor 81. The anodes of triodes 78 and 79 are connected to the respective end terminals of the secondary winding 82 of a transformer 83. The primary winding 84 of transformer 83 is connected across current source 66. The center tap of transformer winding 82 is connected to ground through the first winding 85 of a reversible two-phase induction servo motor 86. A capacitor 87 is connected in parallel with motor winding 85. The second winding 88 of motor 86 is connected in series with current source 66 and a capacitor 89. The drive shaft of motor 86 is mechanically connected to the contactor of potentiometer 61.

Figure 4:
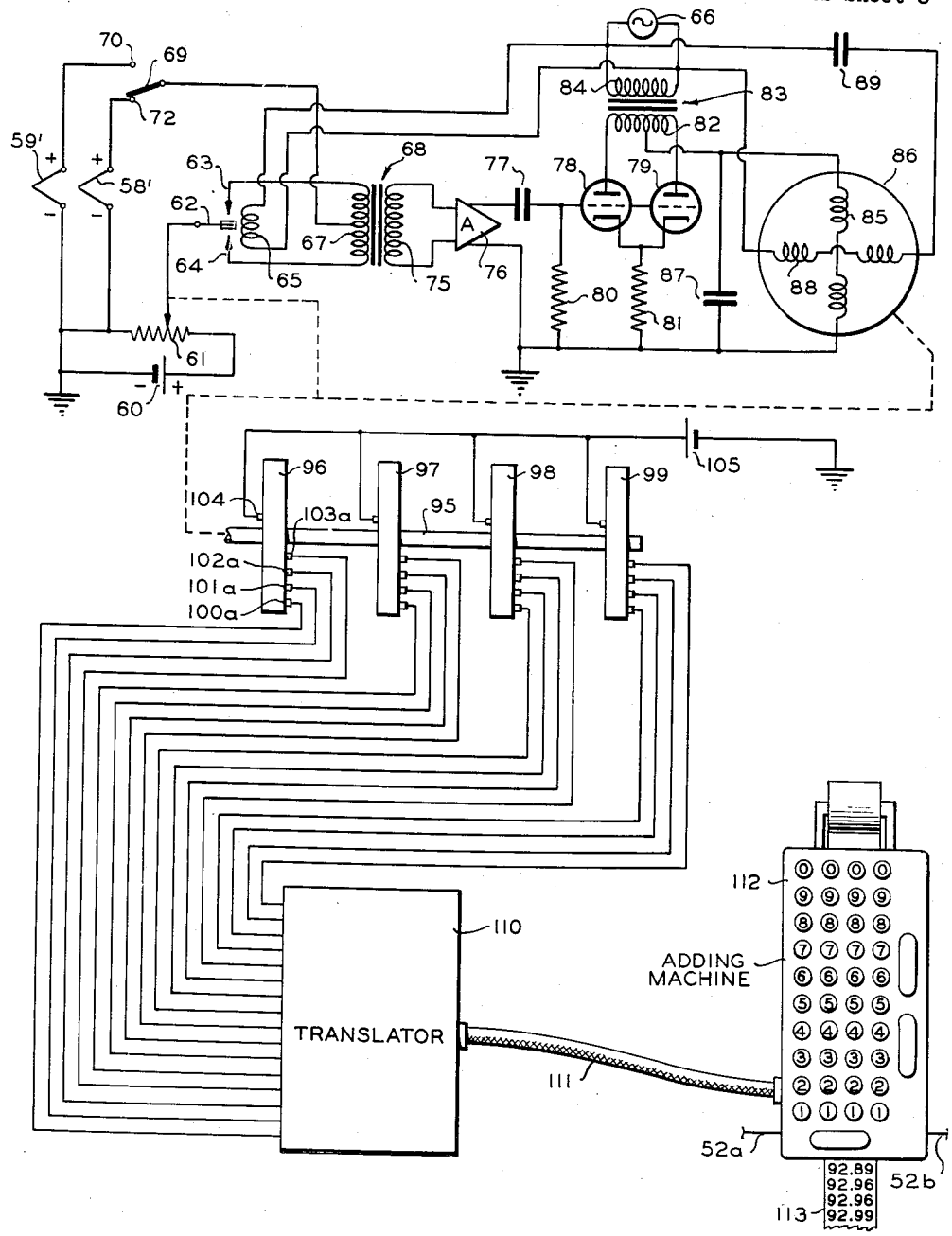
Figure 4 is a schematic representation of the temperature correcting recording apparatus of this invention.

The circuit thus far described in Figure 4 provides a motor shaft rotation which is representative of the temperature of the thermocouple connected in the circuit. The thermocouple voltage is compared with a reference voltage obtained with potentiometer 61. Any voltage difference is converted into an alternating signal by means of vibrating contact 62. This signal is amplified and applied to the motor drive circuit associated with motor 86. Motor 86 rotates in such a direction as to vary the potential obtained from potentiometer 61 until the two voltages being compared are equal. The degree of rotation necessary to accomplish this balanced condition is a function of the measured temperature.

Figures 5, 6:
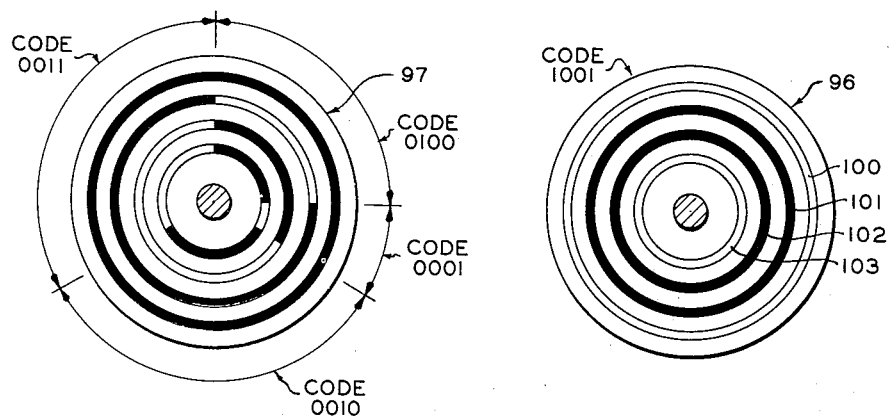
Figure 5 is a schematic view of one of the cummutators employed in the apparatus of Figure 4.
Figure 6 is a view of a second cummutator employed in the apparatus of Figure 4.

The drive shaft of motor 86 is connected to a shaft 95 which carries four commutator disks 96, 97, 98 and 99. Disk 96 is illustrated in Figure 5. The disk is provided with four concentric rings 100, 101, 102 and 103 which are engaged by respective brushes 100a, 101a, 102a and 103a. A brush 104 also engages disk 96. Brush 104 is connected to the first terminal of a voltage source 105, the second terminal of which is grounded. Rings 100 and 103 are formed of a conductive material and rings 101 and 102 are formed of insulating material. Rings 100 and 103 are in electrical contact with disk 96. The remaining disks 97, 98 and 99 are similar to disk 96 except that the respective rings thereon are divided into conducting and non-conducting segments in different manners. Disk 97 is illustrated in Figure 6 and described in detail hereinafter.

Figure 3:
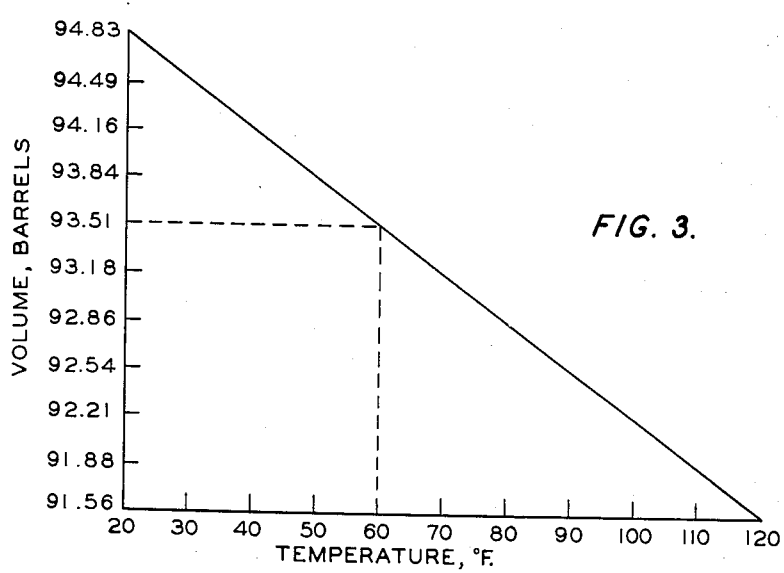
Figure 3 is a graphical representation of the quantity of oil contained in one of the tanks of Figure 1 at different temperatures.

In one specific embodiment of this invention, tanks 16 and 19 each contain 93.51 barrels of oil at 60° F. These tanks contain the equivalent of 94.83 barrels of 60° F. oil at 20° F. and 91.56 barrels of 60° F. oil at 120° F. The equivalent volumes in the tanks at intermediate temperatures are illustrated by the graph of Figure 3. The relationship between the temperature and corrected volume of oil is a linear function. In the specific measuring system described herein it is desired that the temperature corrected volumes of oil be expressed to two decimal places. The commutators 96, 97, 98 and 99 of Figure 4 are adapted to provide electrical signals which are representative of the respective four digits of the corrected volumes of oil in the tanks. These output signals represent a 4-bit weighted code representative of the digital expression of tank volume. A typical 4-bit weighted code which can be employed for this representation is as follows:

| Digit: | Code | Digit: | Code |
|---|---|---|---|
| 0 | 0000 | 5 | 0101 |
| 1 | 0001 | 6 | 0110 |
| 2 | 0010 | 7 | 0111 |
| 3 | 0011 | 8 | 1000 |
| 4 | 0100 | 9 | 1001 |

Shaft 95 is geared to motor 86 so as to make one revolution as the measured temperature changes from 20 to 120° F. Within the temperature range of 20 to 120° F. the first digit of the tank volume is always nine. This is represented by the code 1001. Rings 100 and 103 of disk 96 are thus formed of conductive material, whereas rings 101 and 102 are formed of insulating material. The signal removed by brushes 100a, 101a, 102a and 103a is thus representative of the code 1001. Rings 100 and 103 are at the voltage +1 of source 105 while rings 101 and 102 are at zero voltage.

From an inspection of the graph of Figure 3 it can be seen that the second digit in the volume representation varies from one to four as the temperature changes from 120 to 20° F. Disk 97 provides a code representative of these digits. The first 30° of disk 97, proceeding clockwise from the 90° point, represents the digit one, code 0001. The next 120° represents the digit two, code 0010. The third 120° represents the digit three, code 0011.

The last 90° represents the digit four, code 0100. Disks 98 and 99 are similarly constructed except that the rings are divided into smaller segments to represent the volumes of Figure 3 at 1° increments of temperature. The output signals from commutators 96, 97, 98 and 99 are applied to the input of a translator 110, which provides an output signal representative of the digit established by the four commutators. The output signal of translator 110 is applied by a cable 111 to a printing adding machine 112. The individual keys of adding machine 112 are set continuously in accordance with the position of the four commutators. In this manner the temperature of the oil in the tank is set continuously in adding machine 112. Each time solenoid 52 of Figure 2 is energized to indicate that one of the tanks has started to discharge, adding machine 112 prints a volume on tape 113 which represents the temperature corrected volume of the oil in the tank at that time. Tape 113 thus contains a series of numbers which represent the collected volumes of oil discharged from the measuring tanks during the metering operation. Translator 110 and adding machine 112 can be commercially available equipment well known to those skilled in the digital computer art. Suitable translators are described, for example, in Bulletins 100, 14300-4 and 14300-1A of G. M. Giannini and Co., Inc., Monrovia, California. A suitable adding machine is described, for example, in Bulletin 671-71-2 of Victor Adding Machine Co., Chicago, Illinois.

The apparatus of this invention has been described in conjunction with a metering system wherein the oil to be measured is automatically directed through two tanks of known equal volume. If the volumes of the tanks are unequal, an additional series of commutators can be supplied so that each set of the commutators represents one of the tanks. This arrangement requires an additional switching network so that the commutator set representing the tank being measured is switched into translator 110. It should further be evident that the metering apparatus of this invention can be employed in conjunction with an additional number of metering tanks or with only a single tank, if desired. If only a single tank is employed, the metering operating is intermittent. The present invention thus provides apparatus which is capable of metering liquid automatically and providing a record of the liquid metered in terms of volume of the liquid at a reference temperature. This metering system is particularly useful in automatic custody transferring systems in oil producing operations.

While the invention has been described in conjunction with a present preferred embodiment, it should be evident that it is not limited thereto.

What is claimed is:

1. Apparatus for measuring volumes of liquid in terms of the corresponding volumes at a reference temperature comprising first and second containers of preselected volumes, means to pass liquid to be measured to said containers alternately, means to empty each of said containers when filled, first and second temperature sensing means disposed in and responsive to the temperatures of liquids in said first and second containers, respectively, to provide first and second electrical signals representative of the temperatures, respectively, in said first and second containers, a digital printing recorder, transducing means to provide a coded output signal which represents the volumes of liquids in said containers at a preselected reference temperature when said transducing means is energized by signals representative of measured temperatures of liquids in said containers, means responsive to said first and second electrical signals to energize said transducing means as a function of the temperature of the liquid in the container being filled, a translator, means responsive to the coded output signal from said transducing means to energize said translator, means responsive to the output signal of said translator to set said recorder, and means responsive to said means to empty to actuate said recorder to print a digital record, whereby the printed record of said recorder represents the corresponding volume of liquid in said container at said reference temperature.

2. Apparatus for measuring volumes of liquid in terms of the corresponding volumes at a reference temperature comprising a container of preselected volume, means to pass liquid to be measured into said container, means to empty said container when filled, means disposed in said container to detect the temperature of liquid therein and to provide a first electrical signal representative of the temperature, a digital printing recorder, transducing means to provide a coded output signal which represents the volumes of liquids in said containers at a preselected reference temperature when said transducing means is energized by signals representative of measured temperatures of liquids in said containers, means responsive to said first electrical signal to energize said transducing means, a translator, means responsive to the coded output signal from said transducing means to energize said translator, means responsive to the output signal of said translator to set said recorder, and means responsive to said means to empty to actuate said recorder to print a digital record, whereby the printed record of said recorder represents the corresponding volume of liquid in said container at a reference temperature.

3. The apparatus of claim 2 wherein said transducing means comprises a plurality of disks, one for each digit to be recorded, said disks each comprising a plurality of rings, said rings being formed of segments of material that is conductive and non-conductive in accordance with the coded output to produce, means to apply a potential to the conductive segments, a plurality of brushes in engagement with respective ones of said rings, and means to rotate said disks relative to brushes in response to said first electrical signal.

References Cited in the file of this patent

UNITED STATES PATENTS

| | | |
|---|---|---|
| 2,414,596 | Griffith et al. | Jan. 21, 1947 |
| 2,438,934 | Marsh | Apr. 6, 1948 |
| 2,537,751 | Grise | Jan. 9, 1951 |
| 2,831,350 | Banks et al. | Apr. 22, 1958 |

OTHER REFERENCES

Publication entitled Lease Automatic Custody Transfer Becomes a Reality, by S. H. Pope and R. M. Stuntz in Oil and Gas Journal, April 23, 1956, pages 96-102.